United States Patent Office 3,507,862
Patented Apr. 21, 1970

3,507,862
CLEAVAGE OF CEPHALOSPORIN C
Martha C. Stamper, and Thomas W. McIntyre, Indianapolis, Ind., assignors to Eli Lilly and Company, Indianapolis, Ind., a corporation of Indiana
No Drawing. Continuation-in-part of application Ser. No. 765,640, Oct. 7, 1968. This application Dec. 26, 1968, Ser. No. 787,247
Int. Cl. C07d 99/24
U.S. Cl. 260—243   12 Claims

ABSTRACT OF THE DISCLOSURE

In the preparation of 7-aminocephalosporanic acid (7-ACA) by the chemical cleavage of cephalosporin C and salts thereof with nitrosyl chloride, increased yields are obtained by the addition of 2,2-dimethoxypropane or methyl formate at the completion of the reaction. The dimethoxypropane or methyl formate may be added prior to quenching the reaction or may be included in the quench solvent.

CROSS-REFERENCE TO RELATED APPLICATION

This application is a continuation-in-part of our co-pending application Ser. No. 765,640 filed Oct. 7, 1968.

BACKGROUND OF THE INVENTION

Cephalosporin C, which is obtained by fermentation as described in British patent specification 810,916, has a low order of biological activity. To obtain cephalosporin antibiotics of practical utility it is necessary to chemically convert cephalosporin C to these more active derivatives. This chemical conversion involves the cleavage of the amido group in the 7-position of the cephalosporin nucleus to obtain 7–ACA. The 7–ACA may then be acylated to obtain the desired antibiotics.

Processes for the production of 7–ACA by the chemical cleavage of the 7-amido group of cephalosporin C, or a salt thereof, are described in U.S. Patents 3,188,311 and 3,367,933. The first of these patents describes a process whereby cephalosporin C, which is 7-(5'-amino-N'-adipamyl)cephalosporanic acid, or a salt is treated with a reagent which induces a deamination of the 5'-amino group and consequent cyclization of the resultant carbonium ion to the stabilized imino-lactone derivative of 7–ACA. This cyclic intermediate is then hydrolytically cleaved to yield 7–ACA. Useful reagents for converting cephalosporin C to the cyclic intermediate include nitrosating agents, carbocyclic arenediazonium salts, and compounds that afford positive halogen.

U.S. Patent 3,367,933 describes an improvement on this process in which the solvent comprises formic acid and a diluent which may be a nitrolower alkane, nitrobenzene, a haloloweralkane containing both hydrogen and halogen atoms, or a loweralkyl nitrile, and the intermediate cyclic compound is treated with methanol. The methanol treatment may be effected by evaporation of the solvent followed by treatment of the residue with methanol, or alternatively, the reaction mixture may be added to a large volume of methanol without evaporation of the solvent. In either case the 7–ACA is precipitated from solution by the addition of a base.

In either of the above processes the yield of 7–ACA obtained is at best only about 50 percent of the theoretical yield. There is, therefore, much room for yield improvement.

SUMMARY

We have now found that in the production of 7–ACA by treating cephalosporin C, or a salt thereof, with a nitrosating agent, a carbocyclic arenediazonium salt, or a compound that affords positive halogen at a temperature of not more than 60° C. followed by quenching of the reaction by pouring the reaction mixture into a lower alkanol and precipitating the 7–ACA from this alcoholic solution, improved yields of 7–ACA are obtained by treating the reaction mixture with 2,2-dimethoxypropane or methyl formate at the completion of the reaction. This treatment may be done prior to pouring into the quench solvent or the additive may be present in the quench solvent.

DESCRIPTION OF THE PREFERRED EMBODIMENT

In accordance with our process cephalosporin C, or a salt thereof, is initially treated with a cyclizing reagent as described in U.S. Patent Nos. 3,188,311 and 3,367,933. This reaction may be conducted in formic acid alone; however, it is preferred to use formic acid with a diluent as described in the latter patent. For our process the preferred diluent is acetonitrile or a mixture of nitromethane and nitropropane. Other acceptable diluents are described in U.S. 3,367,933.

The reagent employed in the cleavage reaction is preferably nitrosyl chloride. Other suitable reagents include nitrosating agents, carbocyclic arenediazonium salts, and substances affording positive halogen as described in U.S. 3,188,311. For simplicity we shall refer throughout this specification to nitrosyl chloride with the understanding that other reagents may be used. The molar ratio of nitrosyl chloride to the starting cephalosporin compound should be at least 1:1 and is preferably within the range of 1.5:1 to 2.5:1.

The reaction is quite rapid at temperatures above about −10° C. and is substantially complete upon completion of mixing at these temperatures. To insure complete mixing it is preferred to stir the reaction mixture for a short time such as, for example, from 5 to about 30 minutes after addition of nitrosyl chloride is complete. Temperatures below −10° C. may be employed with correspondingly longer reaction times. The reaction should be conducted at temperatures below 60° C., preferably below 20° C., and still more preferably at about 0° C. such as between −10° C. and +5° C.

At the completion of the reaction, the reaction mixture is treated with an additive which is 2,2-dimethoxypropane or methyl formate. This may be accomplished by adding the dimethoxypropane or methyl formate to the reaction mixture prior to quenching the reaction, or the additive may be dissolved in the quench solvent. We prefer to add the dimethoxypropane or methyl formate to the reaction mixture prior to quenching since less additive is required by this procedure. When this procedure is followed we recommend the addition of from about 0.1 to 2 ml. of additive per gram of cephalosporin C employed in the reaction. The preferred amount is from about 0.6 to 1 ml. per gram of cephalosporin C. If the additive is included as a part of the quench solvent, it is preferred to use much larger excesses because of the dilution involved. Thus, when treatment is accomplished in this manner as much as 10 ml. of dimethoxypropane or methyl formate per gram of cephalosporin C may be used.

While we do not wish to be bound to any theory as to why our process gives improved yields of 7–ACA we believe it is because the additive reacts with both excess nitrosyl chloride and water that may be present in the reaction mixture. Therefore, sufficient time for completion of these reactions of from about 1 to 20 minutes should be allowed.

To recover the 7–ACA from the reaction, the reaction mixture with or without the additive is added to a large volume of a lower alkanol such as methanol, ethanol, or isopropanol to quench the reaction. Methanol is preferred. If the dimethoxypropane or methyl formate has not been added prior to this step, it may be contained in the quench solvent. This quenching of the reaction is described in United States Patent 3,367,933. Cleavage of the cyclic intermediate occurs in the quench solvent.

The 7–ACA is recovered from the quench solution by the addition of a base to adjust the pH to about 3.5. At this pH the 7–ACA precipitates from the solution. Bases that may be used for this precipitation are described in the prior art. The preferred base is ammonium hydroxide.

We have found that when dimethoxypropane or methyl formate is used as described herein the reaction mixture can be allowed to remain in the quench solvent for a longer time to allow more complete cleavage. These longer cleavage times before pH adjustment permit greater recoveries of 7–ACA. Heretofore, the 7–ACA had to be quickly removed from the mixture to avoid further reaction. We have found that we can allow several minutes for the cleavage without adverse effect.

Our process will be further illustrated by the following examples. In all the examples the purity of the product was determined by ultraviolet spectroscopy and the yield figure corrected to reflect the yield of 100 percent 7–ACA. The cephalosporin C referred to in the examples is actually the sodium salt monohydrate.

Example 1

To a cooled solution of 56 g. of cephalosporin C in a mixture of 140 ml. of formic acid and 340 ml. of an equal volume mixture of nitromethane and 2-nitropropane was added 12.6 ml. of nitrosyl chloride in 80 ml. of nitroalkane. The mixture was stirred at approximately 0° C. for a total reaction time of about 15 minutes. At the completion of the reaction the mixture was divided into two equal portions. The first portion was added directly to 900 ml. of cold methanol and the pH of the solution was adjusted to 3.5 by the addition of ammonium hydroxide. The 7–ACA which precipitated was collected by filtration, washed with methanol and ether, and dried in a vacuum oven at 42° C. The yield of 7–ACA was 46.4 percent. The other portion of the reaction mixture was added to a cold mixture of 600 ml. of methanol and 300 ml. of 2,2-dimethoxypropane. The pH was adjusted to 3.5 by the addition of ammonium hydroxide and the 7–ACA was recovered in the same manner as described above. The yield of 7–ACA was 51.9 percent. Thus, the use of dimethoxypropane resulted in a 5.5 percent increase in the yield.

Example 2

A solution of 28 g. of cephalosporin C in 70 ml. of formic acid and 170 ml. of the nitroalkane mixture was treated with 6.3 ml. of nitrosyl chloride in 40 ml. of nitroalkane mixture as described in Example 1. The mixture was poured into 900 ml. of methanol and the 7–ACA was precipitated by the addition of ammonium hydroxide. The yield of 7–ACA from this reaction was 50.9 percent. When this reaction was repeated, except that a mixture of 600 ml. of methanol and 300 ml. of 2,2-dimethoxypropane was employed instead of the 900 ml. of methanol, the yield of 7–ACA was increased to 55.4 percent.

Example 3

Another split reaction was run as in Example 1 using a different lot of cephalosporin C. The yield of 7–ACA using methanol alone as the quench solvent was 54.8 percent. The portion quenched into the mixture of methanol and dimethoxypropane yielded 64.3 percent 7–ACA.

Example 4

A solution of 28 g. of cephalosporin C in 70 ml. of formic acid and 170 ml. of nitroalkane mixture was treated with 6.3 ml. of nitrosyl chloride in 40 ml. of nitroalkane mixture as described in Example 1. The reaction mixture was quenched in 900 ml. of methanol and the 7–ACA precipitated by the addition of ammonium hydroxide. The yield of 7–ACA was 50.8 percent. An additional 28 g. of the same lot of cephalosporin C was treated in the same manner except that 30 ml. of 2,2-dimethoxypropane was added to the reaction mixture prior to quenching into the 900 ml. of methanol. The yield of 7–ACA obtained using this procedure was 56.4 percent. The same procedure was used with another 28 g. of the same lot of cephalosporin C except that 20 ml. of dimethoxypropane was employed. The yield of 7–ACA was 57.4 percent. When 10 ml. of dimethoxypropane was employed in this manner the yield of 7–ACA was 54.4 percent.

Example 5

The procedure of Example 4 was followed using no dimethoxypropane in one case and 25 ml. of dimethoxypropane in a duplicate experiment employing the same lot of cephalosporin C. The yield of 7–ACA obtained when no dimethoxypropane was employed was 48.4 percent. The yield obtained when 25 ml. of dimethoxypropane was added prior to quenching in methanol was 54.5 percent.

Example 6

The procedure of Example 4 was followed for the reaction of nitrosyl chloride with cephalosporin C. When the reaction mixture was quenched into 900 ml. of methanol with no additive the yield of 7–ACA was 50.8 percent. When the reaction was repeated under the same conditions except that 20 ml. of methyl formate was added and the mixture was stirred for 1–2 minutes before quenching into methanol, the yield of 7–ACA was 55.2 percent. When 30 ml. of methyl formate was used the yield was 55.4 percent and when 50 ml. of methyl formate was used the yield was 54.4 percent.

It is apparent from the examples that marked improvement in yields of 7–ACA is obtained by treating the reaction mixture with 2,2-dimethoxypropane or methyl formate prior to recovering the 7–ACA. This treatment may be effected by adding the dimethoxypropane or methyl formate to the reaction mixture at the completion of the reaction, but prior to quenching, or the additive may be contained in the quench solvent.

We claim:

1. In a process for the production of 7-aminocephalosporanic acid by treating cephalosporin C, or a salt thereof, with a reagent selected from the class consisting of nitrosating agents, carbocyclic arenediazonium salts, and compounds that afford positive halogen at a temperature of not more than 60° C., quenching the reaction mixture into a lower alkanol, and precipitating the 7-aminocephalosporanic acid from the solution, the improvement which comprises treating the reaction mixture with 2,2-dimethoxypropane at the completion of the reaction.

2. A method as in claim 1 wherein the 2,2-dimethoxypropane is added to the reaction mixture prior to quenching the reaction mixture into the lower alkanol.

3. A method as in claim 1 wherein the 2,2-dimethoxypropane is contained in the lower alkanol.

4. A method as in claim 1 wherein the reagent is nitrosyl chloride and the lower alkanol is methanol.

5. A method as in claim 4 wherein 2,2-dimethoxypropane is added prior to quenching the reaction mixture into the methanol.

6. A method as in claim 4 wherein the 2,2-dimethoxypropane is contained in the methanol.

7. In a process for the production of 7-aminocephalosporanic acid by treating cephalosporin C, or a salt thereof, with a reagent selected from the class consisting of nitrosating agents, carbocyclic arenediazonium salts, and compounds that afford positive halogen at a temperature of not more than 60° C., quenching the reaction mixture into the lower alkanol, and precipitating the 7-aminocephalosporanic acid from the solution, the improvement which comprises treating the reaction mixture with methyl formate at the completion of the reaction.

8. A method as in claim 7 wherein the methyl formate is added to the reaction mixture prior to quenching the reaction mixture into the lower alkanol.

9. A method as in claim 7 wherein the methyl formate is contained in the lower alkanol.

10. A method as in claim 7 wherein the reagent is nitrosyl chloride and the lower alkanol is methanol.

11. A method as in claim 10 wherein the methyl formate is added prior to quenching the reaction mixture into the methanol.

12. A method as in claim 10 wherein the methyl formate is contained in the methanol.

References Cited

UNITED STATES PATENTS 3,367,933  2/1968  Eardley et al.

NICHOLAS S. RIZZO, Primary Examiner